United States Patent
Sauder et al.

(10) Patent No.: US 11,467,589 B2
(45) Date of Patent: *Oct. 11, 2022

(54) METHODS AND SYSTEMS FOR GENERATING SHARED COLLABORATIVE MAPS

(71) Applicant: Climate LLC, San Francisco, CA (US)

(72) Inventors: Doug Sauder, Livermore, CA (US); Tavis Bones, Morton, IL (US); Tim Reddy, Washington, IL (US)

(73) Assignee: Climate LLC, San Francisco, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/701,647

(22) Filed: Dec. 3, 2019

(65) Prior Publication Data
US 2020/0103910 A1 Apr. 2, 2020

Related U.S. Application Data

(63) Continuation of application No. 15/300,366, filed as application No. PCT/US2015/015252 on Feb. 10, 2015, now Pat. No. 10,528,052.
(Continued)

(51) Int. Cl.
*G05D 1/02* (2020.01)
*A01B 79/00* (2006.01)
(Continued)

(52) U.S. Cl.
CPC ............ *G05D 1/0219* (2013.01); *A01C 7/08* (2013.01); *A01C 21/005* (2013.01); *A01D 41/127* (2013.01); *G05D 1/0287* (2013.01)

(58) Field of Classification Search
CPC .. G05D 1/0219; G05D 1/0287; A01B 79/005; A01C 21/005; A01C 7/08; A01D 41/127
See application file for complete search history.

(56) References Cited

U.S. PATENT DOCUMENTS

| | | | |
|---|---|---|---|
| 6,205,381 B1 | 3/2001 | Motz et al. | |
| 6,216,071 B1 | 4/2001 | Motz | |

(Continued)

FOREIGN PATENT DOCUMENTS

| | | | |
|---|---|---|---|
| CN | 101187902 A | 5/2008 | |
| EP | 2524269 A1 | 11/2012 | |

(Continued)

OTHER PUBLICATIONS

"The Next Frontier in Seed Placement Technology"—Clair Urbain, Equipment, Precision Agriculture, Nov. 1, 2012 https://www.no-tillfarmer.com/articles/275-the-next-frontier-in-seed-placement-technology?v=preview (Year: 2012).*

(Continued)

*Primary Examiner* — Randy A Scott
(74) *Attorney, Agent, or Firm* — Morrison & Foerster LLP (57) ABSTRACT

Described herein are methods and systems for generating shared collaborative maps for planting or harvesting operations. A method of generating a collaborative shared map between machines includes generating a first map for a first machine based on a first set of data and generating a second map for a second machine based on a second set of data. The method further includes generating at least one shared collaborative map for at least one of the first and second machines based on the first and second maps.

20 Claims, 8 Drawing Sheets

Related U.S. Application Data (60) Provisional application No. 61/937,725, filed on Feb. 10, 2014.

(51) Int. Cl.
  *A01C 7/08* (2006.01)
  *A01C 21/00* (2006.01)
  *A01D 41/127* (2006.01)

(56) References Cited

U.S. PATENT DOCUMENTS

| | | | |
|---|---|---|---|
| 7,747,369 | B2 | 6/2010 | Koehrsen et al. |
| 8,371,238 | B2 * | 2/2013 | Dean ............... A01C 7/081 |
| | | | 111/179 |
| 8,639,408 | B2 | 1/2014 | Abdersib |
| 8,639,434 | B2 | 1/2014 | Snoeck et al. |
| 2002/0022928 | A1 * | 2/2002 | Ell ............ G06Q 10/04 |
| | | | 702/2 |
| 2003/0009282 | A1 | 1/2003 | Upadhyaya |
| 2006/0086295 | A1 | 4/2006 | Jensen |
| 2006/0271262 | A1 | 11/2006 | Mclain |
| 2007/0233374 | A1 | 10/2007 | Diekhans et al. |
| 2012/0169495 | A1 * | 7/2012 | Kowalchuk ............ A01C 7/088 |
| | | | 111/171 |
| 2013/0231968 | A1 | 9/2013 | Willness |
| 2014/0012732 | A1 * | 1/2014 | Lindores ............... A01C 21/00 |
| | | | 705/37 |
| 2015/0237795 | A1 | 8/2015 | Koch |
| 2017/0185086 | A1 | 6/2017 | Sauder |

FOREIGN PATENT DOCUMENTS

| | | | |
|---|---|---|---|
| WO | WO 2011/022722 | 2/2011 | |
| WO | WO2011/085430 | 7/2011 | |
| WO | WO-2012015957 A1 * | 2/2012 | ........... H04L 5/0048 |
| WO | WO2012/094256 | 7/2012 | |

OTHER PUBLICATIONS

"The Economics of Automatic Section Control Technology for Planters: A Case Study of Middle and West Tennessee Farms"—Velandia et al, Computers and Electronics in Agriculture, Mar. 14, 2013 https://ag.tennessee.edu/arec/Documents/publications/economics (Year: 2013).*
European Claims in application No. 15 746 044.5-1011, dated Sep. 2019, 3 pages.
Australia Patent Office, "Examination report No. 1", in application No. 2015213589, dated Jan. 31, 2018, 3 pages.
Australian Patent Office, "Search Report" in application No. 2015213589, dated Apr. 17, 2018.
Australian Patent Office, Current Claims in application No. 2015213589, dated Apr. 2018, 4 pages.
China Claims in application No. 201580013567.5, dated May 2019, 5 pages.
Chinese Patent Application No. 201580013567.5, "Translation of Office Action", dated Nov. 15, 2018, 2 pages. Claims in China Application No. 201580013567.5, dated Feb. 2018, 4 pages.
Australia Claims in application No. 2015213589, dated Jan. 2018, 4 pages. Current Claims in application No. PCT/US2017/061846, dated May 2019, 6 pages.
The Patent Office of the People's Republic of China, "Rejection Decision", in Application No. 201580013567.5, dated May 9, 2019, 8 pages.
European Claims in application No. 15746044.5-1655, dated Oct. 2017, 3 pages.
European Patent Office, "Search Report" in application No. 15 746 044.5-1011, dated Sep. 3, 2019, 8 pages.
European Patent Office, "Search Report" in Application No. 15746044.5-1655, dated Oct. 10, 2017, 12 pages.
International Search Report, Application No. PCT/US2015/015252, dated May 15, 2015, 2 pages. State Intellectual Property Office of the People's Republic of China, "Search Report" in applicatio No. 201580013567.5, dated Feb. 26, 2018, 8 pages.
The International Bureau of WIPO, "International Preliminary Report on Patentability" in application No. PCT/US2017/061846, dated May 21, 2019, 16 pages.
Claims in Chinese Patent Application No. 201580013567.5, dated Nov. 2018, 4 pages.
Ukrainian Institute of Intellectual Property, "Preiminary Conclusion of the Substantial Examination" in application No. a21609343, dated Sep. 27, 2019, 5 pages.
Ukrainian Claims in application No. a201609343, dated Sep. 2019, 4 pages.
Ukrainian Institute of Intellectual Property, "Preliminary conclusion of the substantial examination" in application No. a201609343, dated Nov. 2, 2020, 3 pages.
Ukrainian Claims in application No. a201609343, dated Nov. 2020, 4 pages.
Brazil Patent Office, "Written Opinion" in application No. 1120160184408, dated Jul. 28, 2020, 18 pages.
Brazil Claims in application No. 1120160184408, dated Jul. 2020, 3 pages.
Sauder, U.S. Appl. No. 15/300,366, filed Sep. 29, 2016, Office Action, dated Dec. 6, 2018.
Sauder, U.S. Appl. No. 15/300,366, filed Sep. 29, 2016, Office Action, dated May 17, 2019.
Sauder, U.S. Appl. No. 15/300,366, filed Sep. 29, 2016, Office Action, dated May 9, 2018.
Sauder, U.S. Appl. No. 15/300,366, filed Sep. 29, 2016, Notice of Allowance, dated Aug. 30, 2019.
Sauder, U.S. Appl. No. 15/300,366, filed Sep. 29, 2016, Interview Summary, dated Aug. 20, 2019.
Sauder, U.S. Appl. No. 15/300,366, filed Sep. 29, 2016, Interview Summary, dated Apr. 1, 2019.
Sauder, U.S. Appl. No. 15/300,366, filed Sep. 29, 2016, Interview Summary, dated Feb. 2, 2019.
Sauder, U.S. Appl. No. 15/300,366, filed Sep. 29, 2016, Final Office Action, dated Mar. 14, 2019.
Sauder, U.S. Appl. No. 15/300,366, filed Jun. 29, 2016, Final Office Action, dated Aug. 13, 2018.

* cited by examiner

METHODS AND SYSTEMS FOR GENERATING SHARED COLLABORATIVE MAPS

This application claims the benefit under 35 U.S.C. § 120 as a Continuation of application Ser. No. 15/300,366, filed Sep. 26, 2016, which claims the benefit of US national stage application filed under 35 U.S.C. § 371 based upon International Patent Application PCT/US2015/015252, filed Feb. 10, 2015, which claims the benefit of U.S. provisional application 61/937,725, filed Feb. 10, 2014, the entire contents of which are hereby incorporated by reference as if fully set forth herein for all purposes.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter. Swath control prevents the planter from planting in a region that has already been planted by the same planter.

A combine harvester or combine is a machine that harvests crops. A coverage map of a combine displays regions of the field that have been harvested by that combine. A coverage map allows the operator of the combine know that a region of the field has already been harvested by the same combine. The yield calculation for the yield map is altered if only a partial header width as opposed to a full header width is being harvested by the combine. Otherwise, the combine and yield calculation will not know if the combine is only harvesting a partial header width due to a region of the field that has already been harvested by this combine.

DESCRIPTION

Described herein are methods and systems for generating shared collaborative maps for planting and harvesting operations. In one embodiment, a method of generating a collaborative shared map between machines (e.g., planters, combines) includes generating a first map for a first machine based on a first set of data and generating a second map for a second machine based on a second set of data. The method further includes generating at least one shared collaborative map for at least one of the first and second machines based on the first and second maps.

In the various embodiments, a shared collaborative map (e.g., seed coverage map, population map, seed spacing map, downforce map, harvested coverage map, etc.) is provided for display in a cab of a planter or combine. In one embodiment, a shared collaborative seed coverage map allows an operator of a first planter to avoid planting a region of a region that has already been planted by a second planter. Planting regions once rather than accidentally planting a region multiple times saves operator time and reduces equipment operation costs such as maintenance and fuel.

Figure 1A:
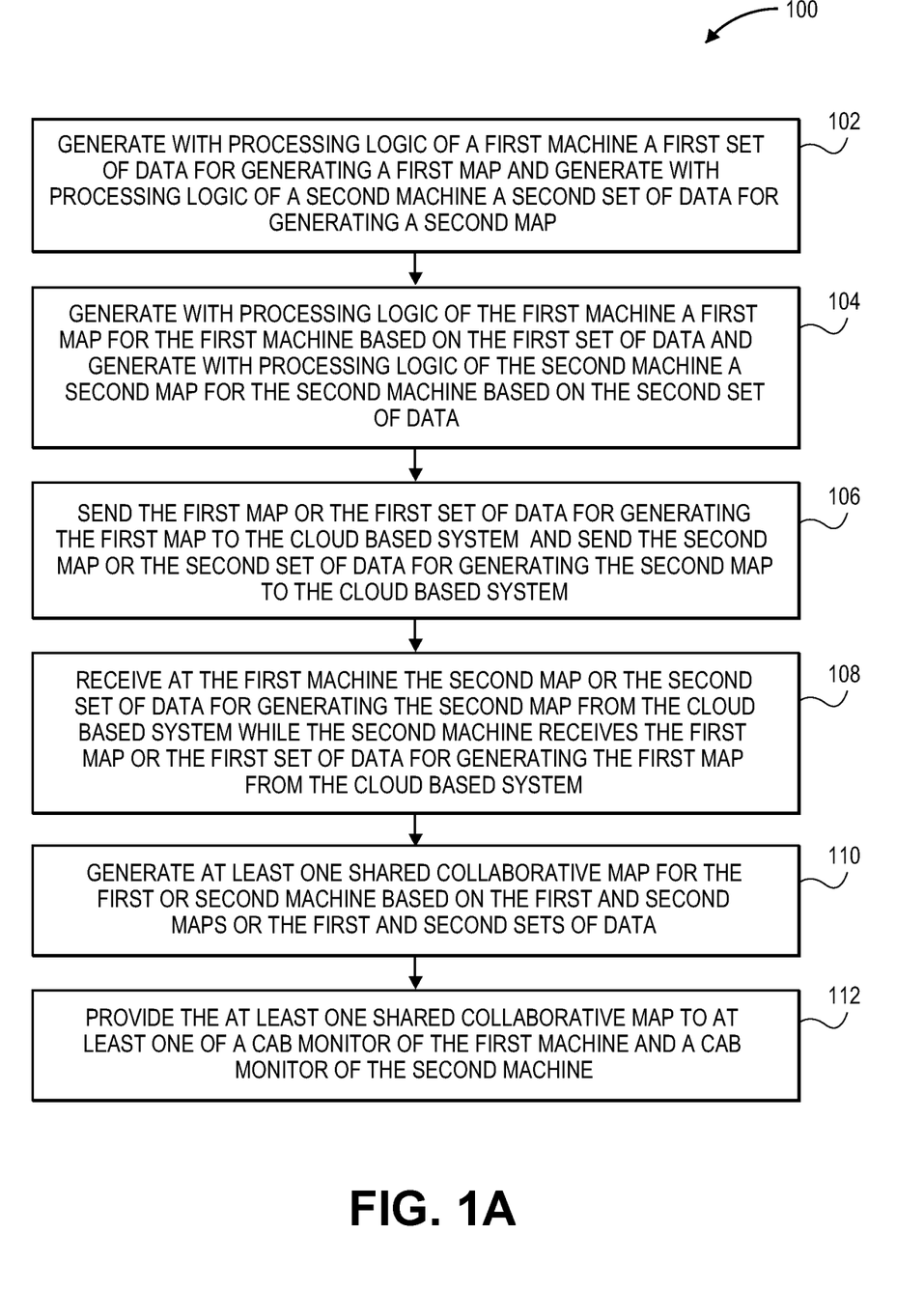
FIG. 1A illustrates a flow diagram of one method of generating a collaborative shared map between machines for planting or harvesting operations.

FIG. 1A illustrates a flow diagram of one embodiment for a method 100 of generating a collaborative shared map between machines for planting or harvesting operations. The machines may both be in operation simultaneously in a field or only one machine may be in operation while another machine has previously been in operation in the field. The method 100 is performed by processing logic that may comprise hardware (circuitry, dedicated logic, etc.), software (such as is run on a general purpose computer system or a dedicated machine or a device), or a combination of both. In one embodiment, the method 100 is performed by processing logic of at least one processing system (e.g., processing system of a planter, processing system of a combine, processing system of a cloud based system), at least one monitor (e.g., processing system of a planter monitor, processing system of a combine monitor), network device, or other electronic device that executes instructions of a software application or program with processing logic. The software application or program can be initiated by an operator of a tractor cab (e.g., planter, combine) while in the planter or combine or the software application or program can be initiated remotely with respect to the planter or combine and one or more of the following operations of method 100 are performed.

At block 102, processing logic of a first machine generates a first set of data associated with the first machine for generating a first map (e.g., planting map, harvesting map) and processing logic of a second machine generates a second set of data associated with the second machine for generating a second map (e.g., planting map, harvesting map). The processing logic of each machine may communicate with a GPS located in each machine in order to generate the first set of data and the second set of data. The first and second sets of data include geo-referenced data. Alternatively, a cloud based system can generate at least one of the first set of data and the second set of data based on communications received from the first and second machines. The first and second sets of data can be generated at similar or different times.

At block 104, the processing logic of the first machine generates the first map for the first machine based on the first set of data and processing logic of the second machine generates the second map for the second machine based on the second set of data. Alternatively, the cloud based system can generate at least one of the first and second maps based on communications received from the first or second machines such as the first set of data or the second set of data. The first and second maps can be generated at similar or different times.

In one embodiment, for a planter, a map indicates seed coverage showing which region(s) in a field have been planted by the planter. The seed coverage map can be displayed on a monitor (e.g., planter monitor 890) in a tractor cab in order for the operator to see which type of seed variety has been planted in a particular region of the field. In another embodiment, for a planter, a map indicates seed population (e.g., number of seeds per acre that have been planted). In another embodiment, for a planter, a map indicates seed spacing such that an operator can determine how evenly the seeds are spaced. In an embodiment, a map for a planter indicates downforce in planting seeds. An operator can determine how much additional downforce was applied or how much net downforce was applied to the ground when planting the seeds.

In one embodiment, for a combine, a map shows harvested coverage of the combine such that an operator knows which region(s) have been harvested. In an embodiment, for a combine, a map show yield (e.g., corn or soybean yield in terms of bushels per acre).

At block 106, processing logic of the first machine sends the first map or first set of data for generating the first map to the cloud based system and processing logic of the second machine sends the second map or second set of data for generating the second map to the cloud based system. The processing logic of each machine may communicate with a network interface of each machine for sending the maps or data to the cloud based system. The first and second maps and first and second sets of data can be sent to the cloud based system at similar or different times.

At block 108, processing logic of the first machine receives the second map or second set of data for generating the second map from the cloud based system and processing logic of the second machine receives the first map or first set of data for generating the first map from the cloud based system. The first and second sets of data or first and second maps can be received at similar or different times.

At block 110, processing logic generates at least one shared collaborative map for the first or second machine based on the first and second maps or based on the first and second sets of data. For example, processing logic of at least one of the first machine, the second machine, and the cloud based system generates the at least one shared collaborative map.

In one embodiment, processing logic of the first machine then generates a first shared collaborative map based on the first and second maps or data for generating the first and second map and processing logic of the second machine generates a second shared collaborative map based on the first and second maps or data for generating the first and second maps. The first and second shared collaborative maps can be the same or different. The first and second shared collaborative maps can be generated at similar or different times.

In an embodiment, a network interface of the first machine communicates with a network interface of the second machine (e.g., peer to peer). Processing logic of the first machine generates the first set of data and sends the first set of data directly to the second machine and processing logic of the second machine generates the second set of data and sends the second set of data directly to the first machine. The first machine then generates a first shared collaborative map based on the first and second sets of data and the second machine generates a second shared collaborative map based on the first and second sets of data. Alternatively, processing logic of the first machine generates the first map and sends the first map directly to the second machine and processing logic of the second machine generates the second map and sends the second map directly to the first machine. The first machine then generates a first shared collaborative map based on the first and second maps while the second machine generates a second shared collaborative map based on the first and second maps.

At block 112, processing logic provides the at least one shared collaborative map to at least one of a cab monitor of the first machine and a cab monitor of the second machine. For example, processing logic of the first machine provides a first shared collaborative map to the cab monitor of the first machine and the processing logic of the second machine provides a second shared collaborative map to the cab monitor of the second machine. The first set of data, second set of data, first map, second map, and at least one collaborative map are generated and communicated between machines and the cloud based system in "real time" or close to "real time" (e.g., every 5 to 10 seconds).

Figure 1B:
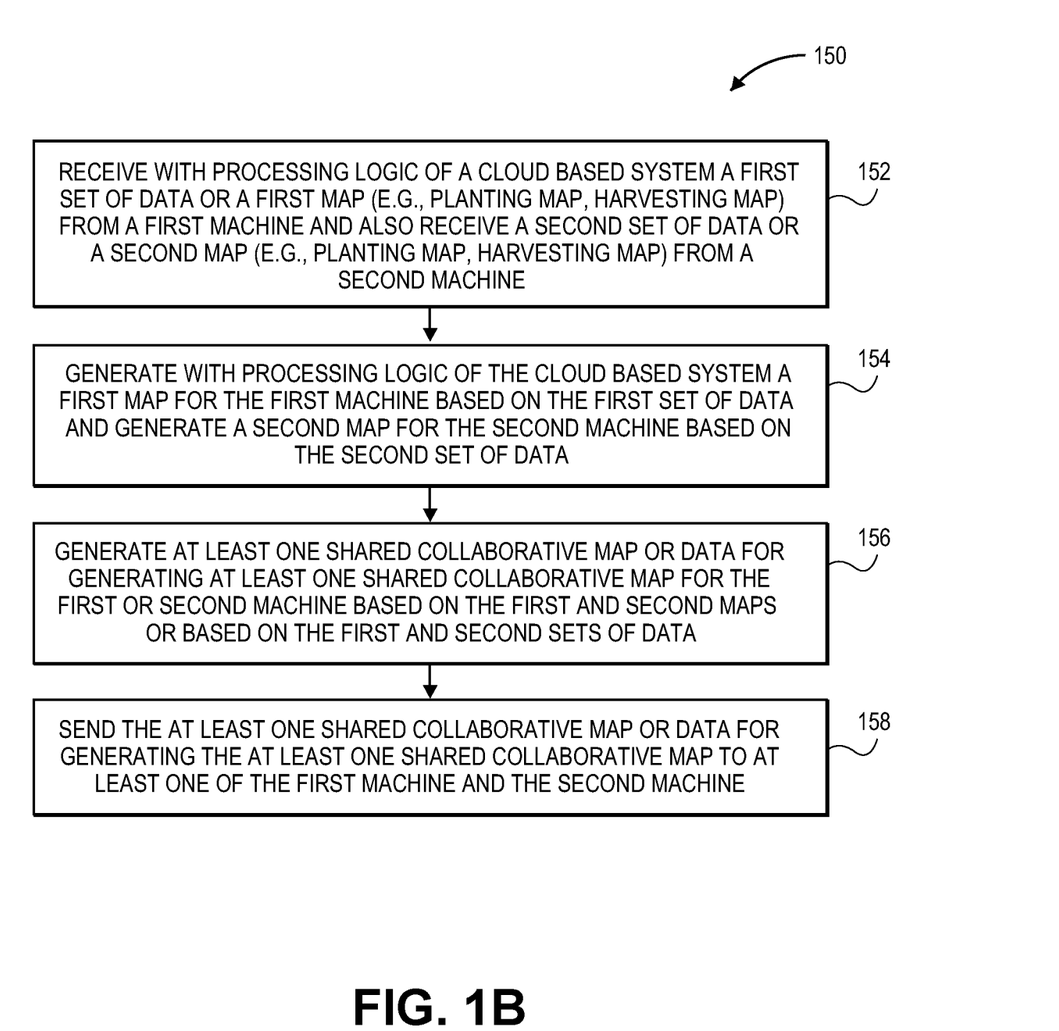
FIG. 1B illustrates a flow diagram of another method of generating a collaborative shared map between machines for planting or harvesting operations.

FIG. 18B illustrates a flow diagram of another embodiment for a method 150 of generating a collaborative shared map between machines for planting or harvesting operations. The machines may both be in operation simultaneously in a field or only one machine may be in operation while another machine has previously been in operation in the field. The method 150 is performed by processing logic that may comprise hardware (circuitry, dedicated logic, etc.), software (such as is run on a general purpose computer system or a dedicated machine or a device), or a combination of both. In one embodiment, the method 150 is performed by processing logic of at least one processing system (e.g., processing system of a planter processing system of a combine, processing system of a cloud based system), at least one monitor (e.g., processing system of a planter monitor, processing system of a combine monitor), network device, or other electronic device that executes instructions of a software application or program with processing logic. The software application or program can be initiated by an operator of a tractor cab (e.g., planter, combine) while in the planter or combine or the software application or program can be initiated remotely with respect to the planter or combine and one or more of the following operations of method 150 are performed.

At block 152, processing logic of a cloud based system receives a first set of data or a first map (e.g., planting map, harvesting map) from a first machine and also receives a second set of data or a second map (e.g., planting map, harvesting map) from a second machine. The cloud based system receives communications that include at least one of data and maps from the first and second machines. The first and second sets of data can be received at similar or different times.

At block 154, the processing logic of the cloud based system optionally generates a first map for the first machine based on the first set of data and optionally generates a second map for the second machine based on the second set of data. Alternatively, the cloud based system does not need to generate the first and second maps if these maps are received from the first and second machines.

At block 156, processing logic of the cloud based system generates at least one shared collaborative map or data for generating at least one shared collaborative map for the first or second machine based on the first and second maps or based on the first and second sets of data. For example, processing logic of the cloud based system generates a first shared collaborative map for the first machine and a second shared collaborative map for the second machine.

At block 158, processing logic of the cloud based system sends the at least one shared collaborative map or data for generating the at least one shared collaborative map to at least one of the first machine and the second machine. For example, processing logic of the cloud based system sends a first shared collaborative map to the cab monitor of the first machine and sends a second shared collaborative map to the cab monitor of the second machine. The first set of data, second set of data, first map, second map, and at least one collaborative map are generated and communicated between machines and the cloud based system in "real time" or close to "real time" (e.g., every 5 to 10 seconds).

Figure 2:
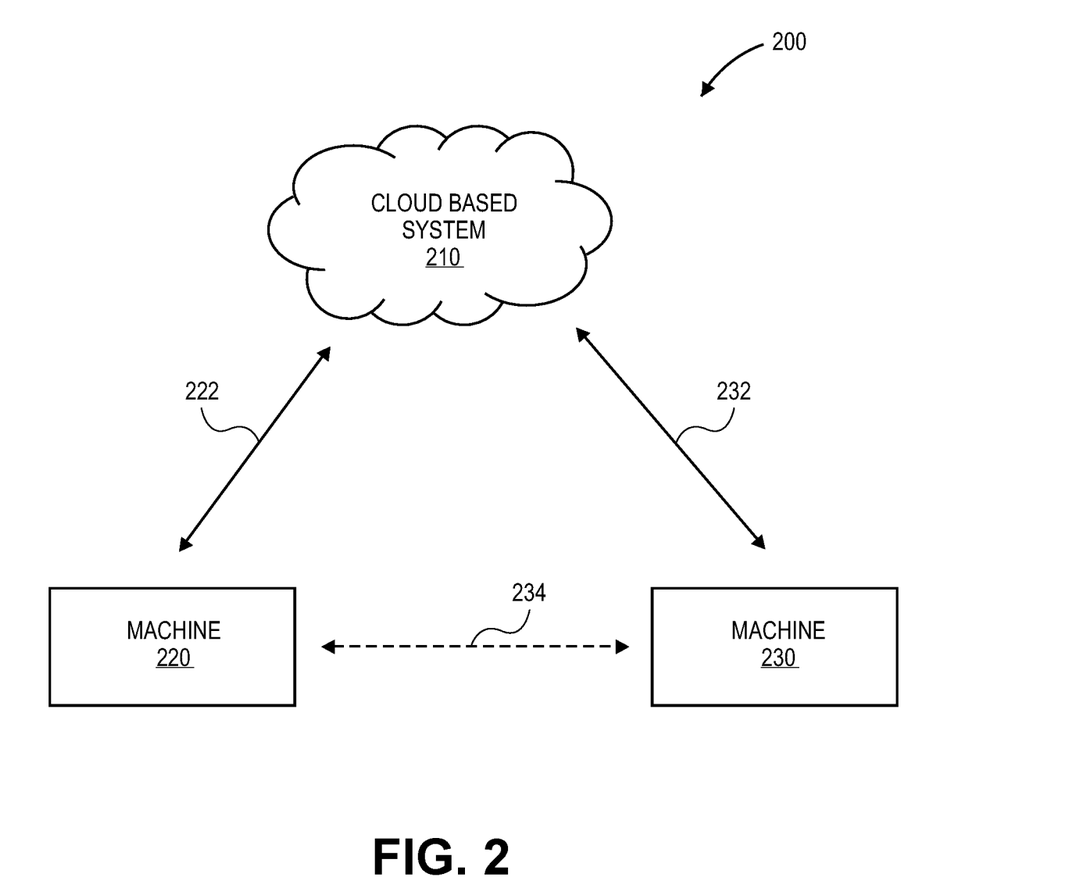
FIG. 2 illustrates a system for generating a collaborative shared map between machines for planting or harvesting operations in accordance with one embodiment.

FIG. 2 illustrates a system for generating a collaborative shared map between machines for planting or harvesting operations in accordance with one embodiment. The system 200 includes a cloud based system 210, a machine 220 (e.g., planter, combine), and a machine 230 (e.g., planter, combine). The system 200 is capable of performing the operations of the methods (e.g., method 100, method 150, method 700) disclosed herein. Communications 222 and 232 are bi-directional communications. These communications are sent from the machines 220 and 230 to the cloud based system 210, which also sends communications to machines 220 and 230. The communications may include any type of data communication, instructions, commands, etc. for implementing various functions including generating maps specific to each machine or the shared collaborative maps. The communications described herein may be enabled by an appropriate in-field data processing system (e.g., the system 1000 described below) having a network interface.

In one embodiment, machine 220 generates a first map based on a first set of data that is associated with the machine 220. A GPS located in machine 220 provides geo-referenced data for generating the first map. The machine 220 sends the first map to the cloud based system 210. In a similar manner, machine 230 generates a second map based on a second set of data that is associated with the machine 230. A GPS located in machine 230 provides geo-referenced data for generating the second map. The machine 230 sends the second map to the cloud based system 210. The cloud based system sends the first map to the machine 230 and the second map to the machine 220. The machine 220 generates a first shared collaborative map based on the first and second maps and the machine 230 generates a second shared collaborative map based on the first and second maps.

In another embodiment, the cloud based system generates shared collaborative maps based on data received from the machines or maps received from the machines. The cloud based system then sends the shared collaborative maps to the machines.

In another embodiment, machine 220 is optionally capable of communicating (e.g., peer to peer) directly with machine 230 via bi-directional communications 234. The first machine generates the first map and sends the first map directly to the second machine and the second machine generates the second map and sends the second map directly to the first machine. The first machine then generates a first shared collaborative map based on the first and second maps and the second machine generates a second shared collaborative map based on the first and second maps.

Alternatively, the first machine generates a first set of data for generating a first map and sends the first set of data directly to the second machine and the second machine generates a second set of data for generating a second map and sends the second set of data directly to the first machine. The first machine then generates a first shared collaborative map based on the first and second sets of data and the second machine generates a second shared collaborative map based on the first and second sets of data.

Figure 3:
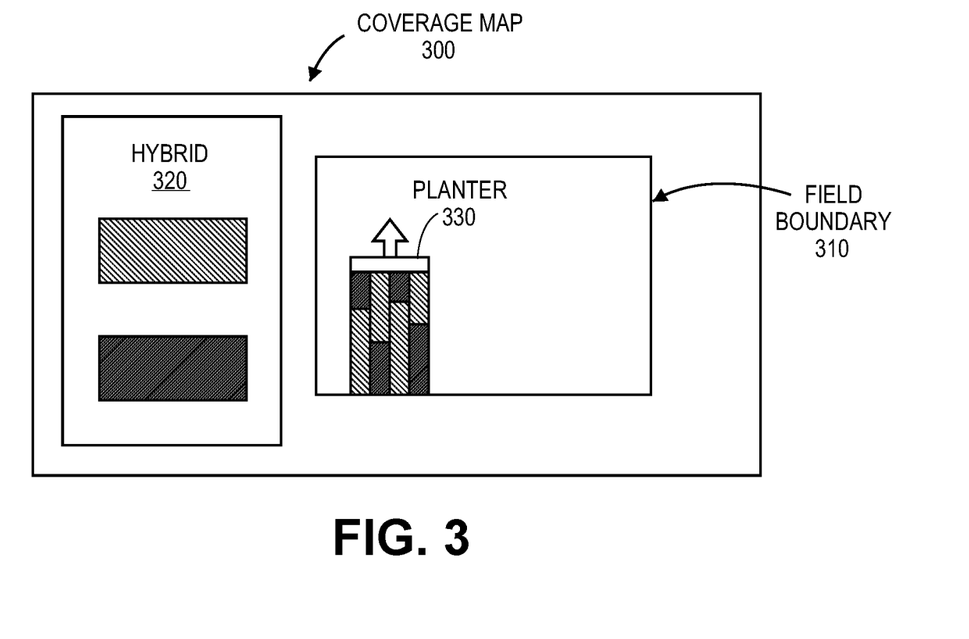
FIG. 3 illustrates an embodiment of a seed coverage map.

FIG. 3 illustrates an embodiment of a seed coverage map 300. The seed coverage map 300 is displayed on a monitor (e.g., planter monitor 890, display device 1030) in a tractor cab of a planter 330 in order for the operator to see which type of seed variety has been planted in a particular region of the field. The hybrid key 320 can include a first color to indicate a first region that has been planted with seed type "A" and a second color to indicate a second region that has been planted with seed type "B." The first and second colors are used inside the field boundary 310 on the map 300 and show the "as-planted" seed type in relation to a planter 330. The first color may indicate a first seed type while the second color indicates a second seed type. In one embodiment, the seed coverage map is updated dynamically in real-time as the planter moves through the field.

In another embodiment, the map consists of other goo-referenced data collected by the planter (e.g., seed population, downforce applied to the planter, downforce between a planter row unit and the soil, soil moisture, soil temperature, etc.). Each type of map is preferably generated by taking a measurement on the machine (e.g., number of seeds detected by a seed sensor) and associating the measurement with a position reported by a GPS receiver.

Figure 4:
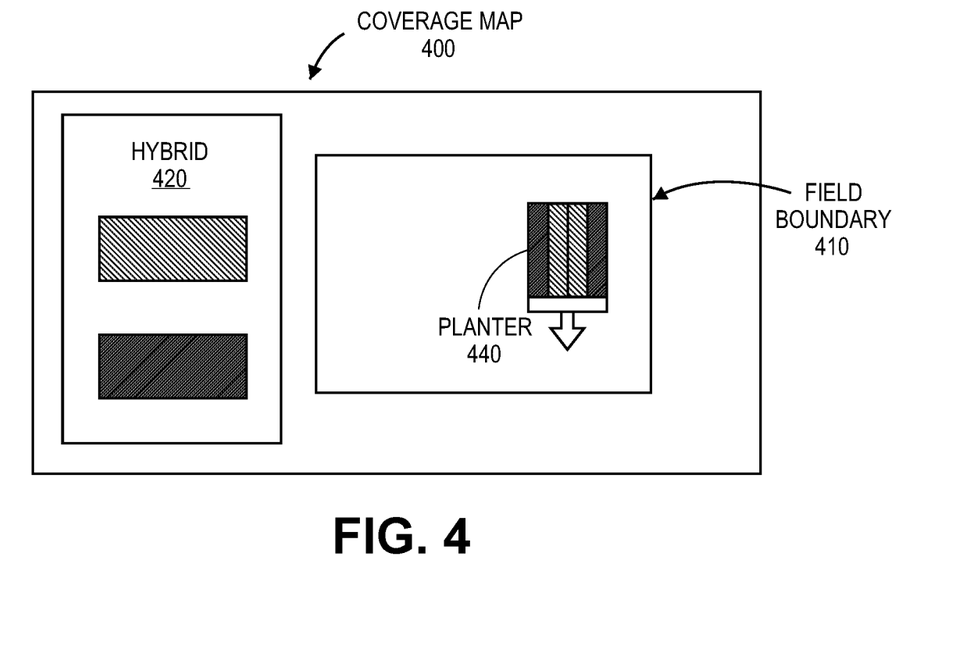
FIG. 4 illustrates another embodiment of a seed coverage map.

FIG. 4 illustrates another embodiment of a seed coverage map 400. The seed coverage map 400 is displayed on a monitor (e.g., planter monitor 890, display device 1030) in a tractor cab of a planter 440 in order for the operator to see which type of seed variety has been planted in a particular region of the field. The hybrid key 420 can include a first color to indicate a first region that has been planted with seed type "A" and a second color to indicate a second region that has been planted with seed type "B." The first and second colors are used inside the field boundary 410 on the map 400 and show the "as-planted" seed type in relation to a planter 4. The first color may indicate a first seed type while the second color indicates a second seed type. In one embodiment, the seed coverage map is updated dynamically in real-time as the planter moves through the field.

Figure 5:
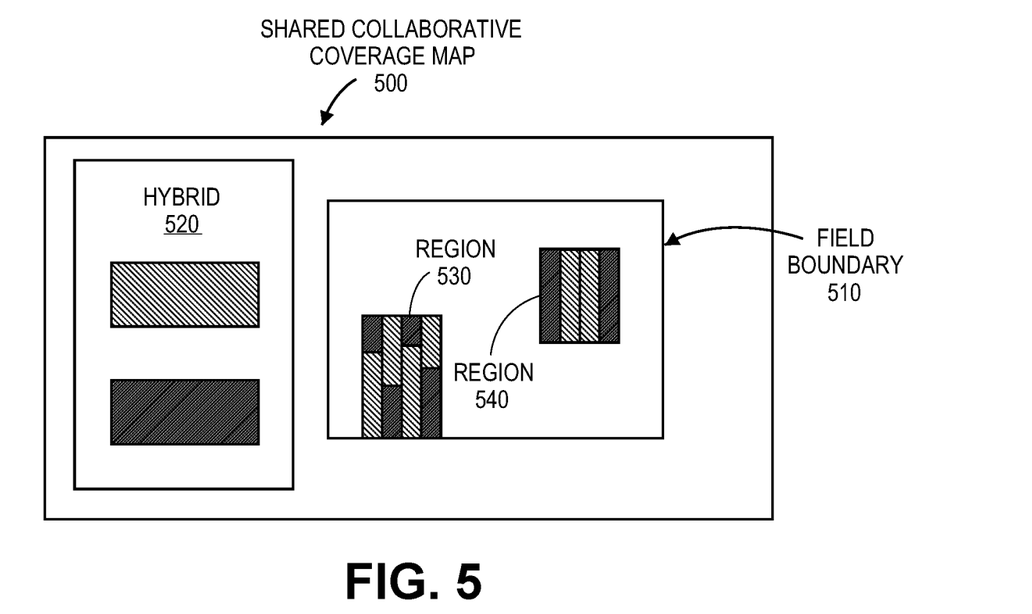
FIG. 5 illustrates an embodiment of a shared collaborative seed coverage map.

FIG. 5 illustrates an embodiment of a shared collaborative seed coverage map 500. The shared collaborative seed coverage map 500 is displayed on a monitor (e.g., planter monitor 890, display device 1030) in a tractor cab of a planter 330 and planter 440 in order for the operator to see which type of seed variety has been planted in particular regions 530 and 540 of the field by the planter 330 and the planter 440. The shared collaborative seed coverage map 500 is generated by processing logic of one or both of the planters 330 and 440. Alternatively, a cloud based system generates the shared collaborative seed coverage map 500 and sends this map to the planters 330 and 440.

The hybrid key 520 can include a first color to indicate a first region that has been planted with seed type "A" and a second color to indicate a second region that has been planted with seed type "B." The first and second colors are used inside the field boundary 510 on the map 500 and show the "as-planted" seed type in relation to the planter 330 and the planter 440. The first color may indicate a first seed type while the second color indicates a second seed type. In one embodiment, the shared collaborative seed coverage map 500 is updated dynamically in real-time as the planters move through the field. Operators of the planters 330 and 440 can then avoid replanting regions of the field that have already been planted by one of the planters based on knowledge of the shared collaborative map.

Figure 6:
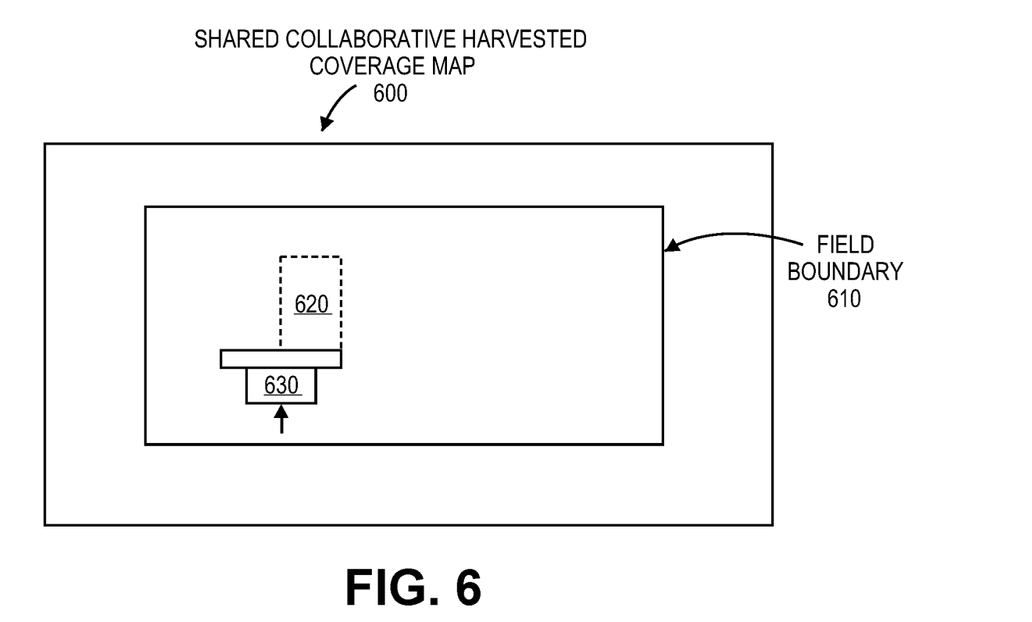
FIG. 6 illustrates an embodiment of a collaborative yield map.

FIG. 6 illustrates an embodiment of a shared collaborative harvested coverage map 600. The shared collaborative harvested coverage map 600 is displayed on a monitor (e.g., display device 1030) in a tractor cab of a combine 630 in order for the operator to see which region(s) of a field with field boundary 610 have been harvested by the combine 630 or another combine. Another combine has already harvested a region 620. A plurality of yield measurements are calculated based on a strain gauge signal or other signal related to weight or flow of harvested grain in the combine; a yield map is generated by associating each measurement with an geo-referenced area harvested based on positions reported by a GPS receiver. A machine 630 (e.g., combine) is generally not aware whether a full or partial header width is being harvested. Thus, the yield calculation needs to take into account whether a full header width is being harvested or merely a partial header width in order to obtain an accurate yield calculation. The harvested coverage map 600 having an awareness of harvested regions for the combine 630 and other combines allows the operator of the combine 630 to know which regions have already been harvested including regions harvested by other combines.

The shared collaborative harvested coverage map 600 is generated by processing logic of the combine 630. Alternatively, a cloud based system generates the shared collaborative harvested coverage map 600 and sends this map to the combine 630.

In one embodiment, the shared collaborative harvested coverage map 600 and one or more yield maps are updated dynamically in real-time as the combine 630 or any other combine move through the field. Operators of the combines can then avoid harvesting regions of the field that have already been harvested by one of the combines based on knowledge of the shared collaborative harvested coverage map.

Figure 7:
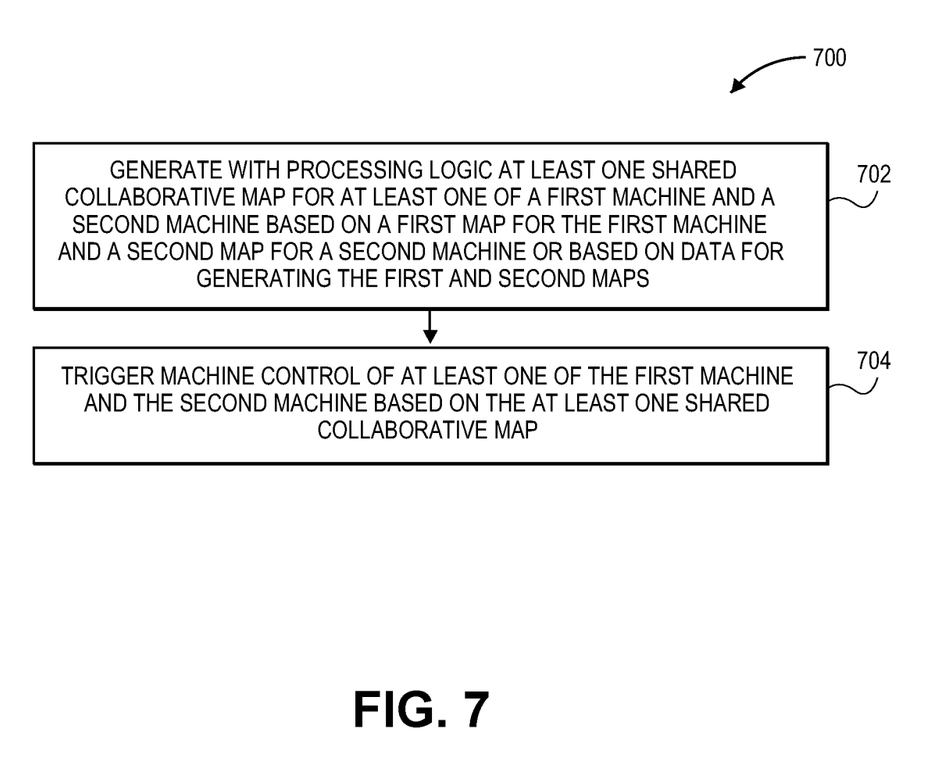
FIG. 7 illustrates a flow diagram of one method of triggering machine control of a machine based on a shared collaborative map.

FIG. 7 illustrates a flow diagram of one embodiment for a method 700 of triggering machine control of a machine based on a shared collaborative map. The method 700 is performed by processing logic that may comprise hardware (circuitry, dedicated logic, etc.), software (such as is run on a general purpose computer system or a dedicated machine or a device), or a combination of both. In one embodiment, the method 700 is performed by processing logic of at least one processing system (e.g., processing system of a planter, processing system of a combine, processing system of a cloud based system), at least one monitor (e.g., processing system of a planter monitor, processing system of a combine monitor), network device, or other electronic device that executes instructions of a software application or program with processing logic. The software application or program can be initiated by an operator of a tractor cab (e.g., planter, combine) while in the planter or combine or the software application or program can be initiated remotely with respect to the planter or combine and one or more of the following operations of method 700 are performed.

At block 702, processing logic generates at least one shared collaborative map for at least one of a first machine and a second machine based on a first map for the first machine and a second map for the second machine or based on data for generating for the first and second maps. For example, processing logic of at least one of the first machine, the second machine, and the cloud based system generates the at least one shared collaborative map.

In one embodiment, processing logic of the first machine generates the first map and sends the first map to the cloud based system and processing logic of the second machine generates the second map and sends the second map to the cloud based system. The cloud based system then sends the first map to the second machine and the second map to the first machine. Processing logic of the first machine then generates a first shared collaborative map based on the first and second maps and processing logic of the second machine generates a second shared collaborative map based on the first and second maps. The first and second shared collaborative maps can be the same or different.

At block 704, processing logic triggers machine control of at least one of the first machine and the second machine based on the at least one shared collaborative map. For example, for a planter, processing logic of the first machine triggers machine control (e.g., swath control) of the first machine that uses clutches or shut off control of seed meters to avoid having the first machine replant regions that have already been planted by the first or second machine. Alternatively, processing logic of the second machine triggers machine control of the second machine that uses clutches or shut off control of seed meters to avoid having the second machine replant regions that have already been planted by the first or second machine.

The first map, second map, data for generating these maps, and the at least one collaborative map are generated and communicated between machines and the cloud based system in "real time" or close to "real time" (e.g., every 5 to 10 seconds).

In some embodiments, the operations of the methods disclosed herein can be altered, modified, combined, or deleted. For example, the operation of block 154 may be optional depending on the operation of block 152. Additionally, the embodiments of the methods disclosed herein may be performed with a device, an apparatus, or data processing system as described herein. The device, apparatus, or data processing system may be a conventional, general-purpose computer system or special purpose computers, which are designed or programmed to perform only one function, may also be used.

Figure 8:
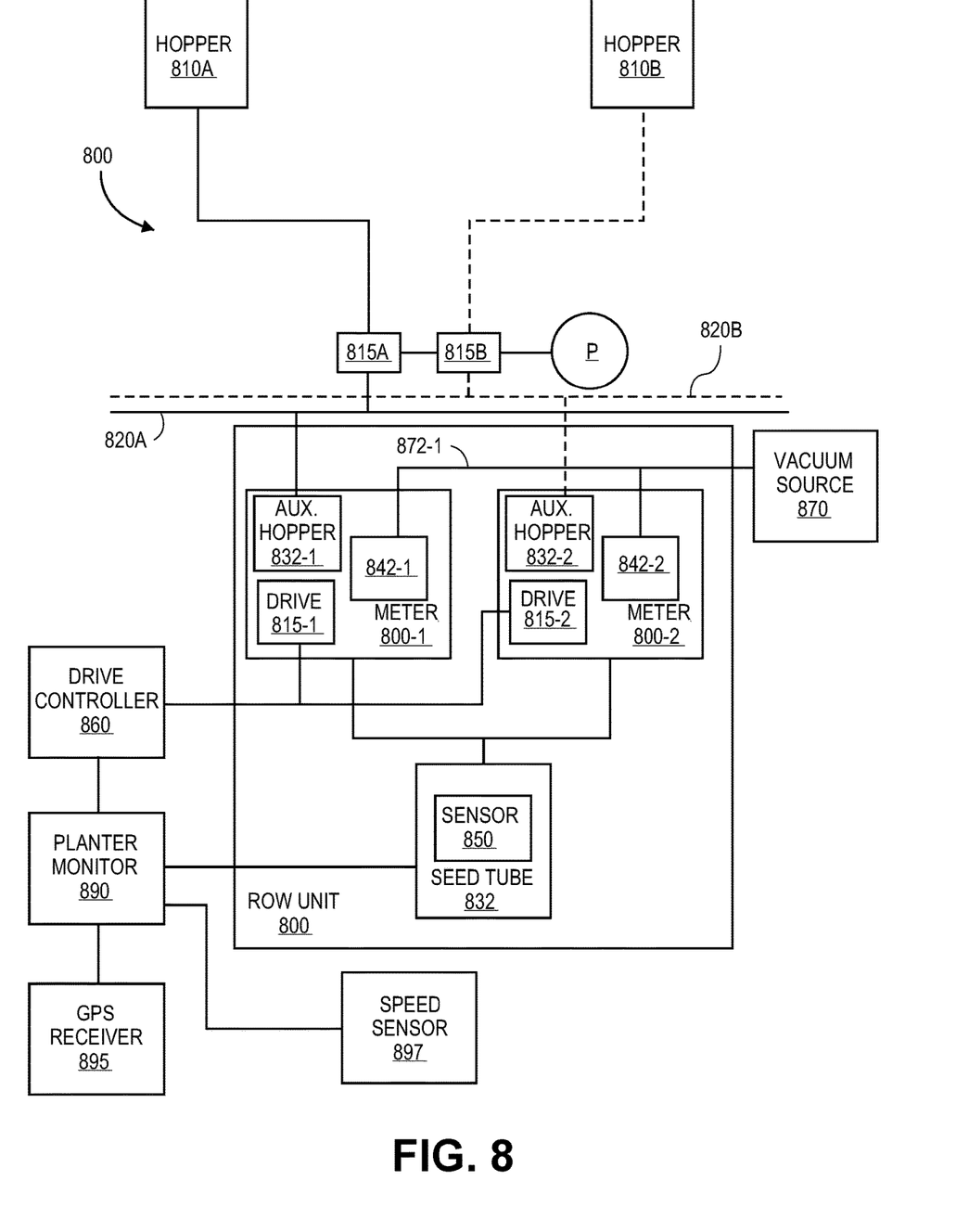
FIG. 8 illustrates a block diagram of a multi-hybrid planter having a seed variety selection system in accordance with one embodiment.

FIG. 8 illustrates a block diagram of a multi-hybrid planter having a seed variety selection system. The planter 800 preferably includes a plurality of bulk hoppers 810 (e.g., two bulk hoppers 810a and 810b as illustrated). The first bulk hopper 810a preferably contains a first seed variety (e.g., a first corn seed variety or a first soybean variety); the second bulk hopper 810b preferably contains a second seed variety (e.g., a second corn seed variety or a second soybean variety). Each bulk hopper is preferably in fluid communication with an individual seed entrainer (e.g., 815a, 815b). Each seed entrainer is preferably mounted to a lower outlet of the associated bulk hopper 810. Each seed entrainer is preferably in fluid communication with a pneumatic pressure source P and configured to convey air-entrained seeds through a plurality of seed lines (e.g., 820a, 820b) to the row units 800. Via a plurality of seed lines 820a, the bulk hopper 810a and the entrainer 815a are preferably in seed communication with a first seed meter 800-1 (e.g., with the auxiliary hopper 832-1) of each row unit 800 along the toolbar 814. In operation, the bulk hopper 810a supplies the first seed variety to the first meter 800-1 of each row unit 800. Via seed lines 820b, the bulk hopper 810b and the entrainer 815b are preferably in seed communication with the second seed meter 800-2 (e.g., with the auxiliary hopper 832-2) of each row unit 800 along a toolbar. In operation, the bulk hopper 810b supplies the second seed variety to the second meter 800-2 of each row unit 800.

Each drive 815-1, 815-2 is preferably in data communication with a drive controller 860. The drive controller is preferably configured to generate a drive command signal corresponding to a desired rate of seed disc rotation. In some embodiments the drive 815 may comprise an electric motor. The drive controller 860 is preferably in data communication with a planter monitor 890. The planter monitor 890 preferably includes a memory, a processor, and a user interface. The planter monitor is preferably configured to send drive command signals and/or desired rates of seed disc rotation to the drive controller 860. The planter monitor 890 is preferably in data communication with a GPS receiver 895 mounted to either the planter or the tractor used to draw the planter. The planter monitor 890 is preferably in data communication with a speed sensor 897 (e.g., a radar speed sensor) mounted to either the planter or the tractor. As used herein, "data communication" may refer to any of electrical communication, electronic communication, wireless (e.g., radio, microwave, infrared, sonic, near field, etc.) communication, or communication by any other medium configured to transmit analog signals or digital data.

Each vacuum port 842 (e.g., 842-1, 842-2) is preferably in fluid communication with a vacuum source 870 via a vacuum line 872 (e.g., 872-1). Both the first seed meter 800-1 and the second seed meter 800-2 of each row unit 800 are preferably in seed communication with (e.g., disposed to deposit seed into) a seed tube 832 associated with the row unit 800. The seed sensor 850 associated with the seed tube 832 of each row unit 800 is preferably in data communication with the planter monitor 890.

Figure 9:
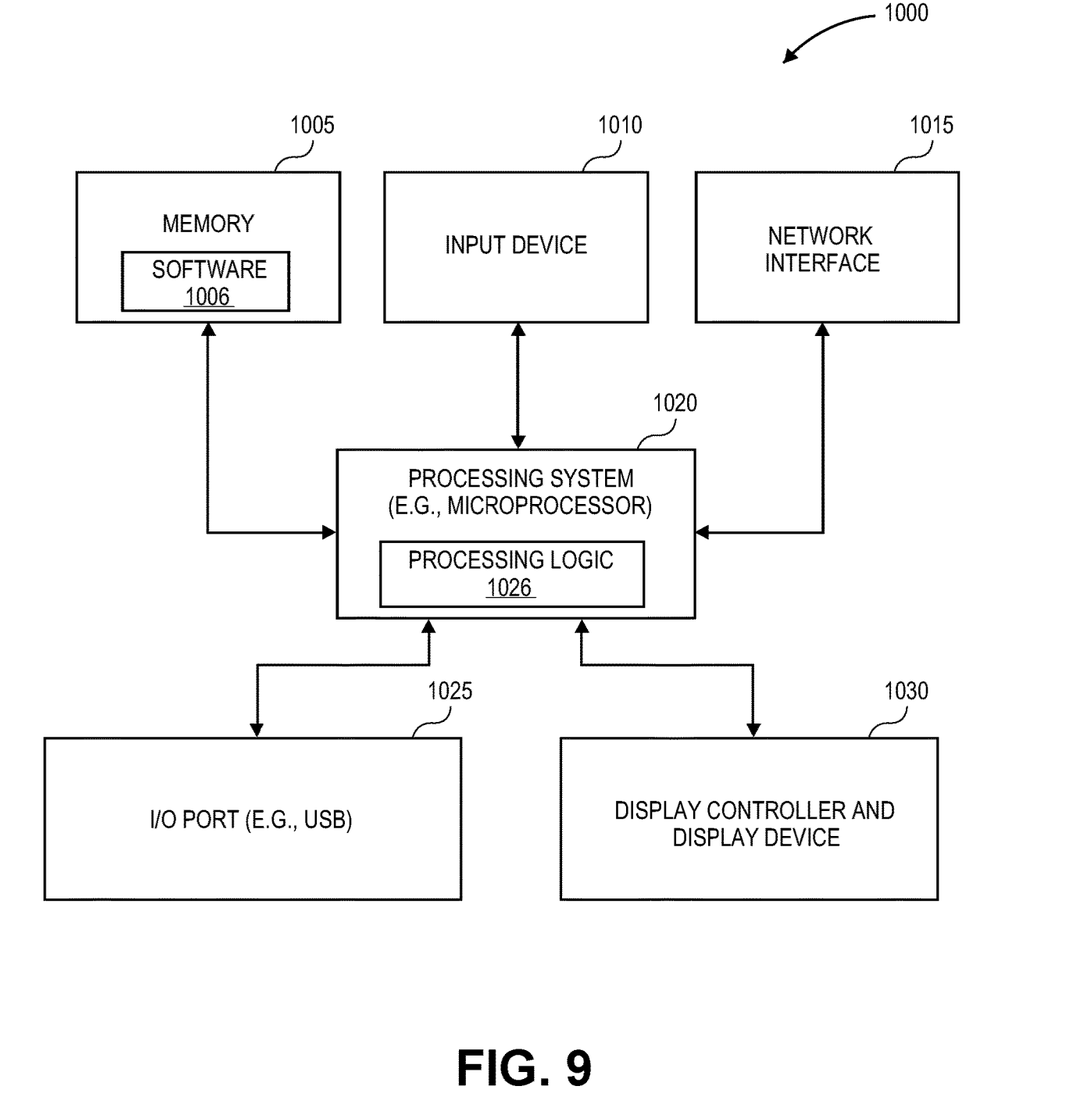
FIG. 9 shows an example of data processing system in accordance with one embodiment.

FIG. 9 shows an example of a data processing system (e.g., data processing system of planter, data processing of a planter monitor, data processing system of combine, data processing system of cloud based system) in accordance with one embodiment. For example and in one embodiment, the system may be implemented as a data processing device such a desktop computer, server, cloud based system, planter, planter monitor, combine, laptop, tablet, computer terminal, a handheld computer, a personal digital assistant, a cellular telephone, a camera, a smart phone, mobile phone, an email device, or a combination of any of these or other data processing devices.

In other embodiments, the data processing system may be a network computer or an embedded processing device within another device (e.g., planter monitor, yield monitor) or within a machine (e.g., planter, combine), or other types of data processing system having fewer components or perhaps more components than that shown in FIG. 9.

The data processing system 1000 shown in FIG. 9 includes a processing system 1020, which may be one or more microprocessors or which may be a system on a chip (integrated circuit) and the system also includes memory 1005 for storing data and programs for execution (software 1006) by the processing system. The memory 1005 can store, for example, the software components described above such as the software application for executing the operations of method 100, method 150, or method 700 and memory 1005 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

A display controller and display device 1030 can provide a visual user interface for a user or operator. The system also can include a network interface 1015 to communicate with another data processing system. The network interface can be a GPS transceiver, a WLAN transceiver (e.g., WiFi), an infrared transceiver, a Bluetooth transceiver, a wireless cellular telephony transceiver, Ethernet, or other. It will be appreciated that additional components, not shown, may also be part of the system in certain embodiments, and in certain embodiments fewer components than shown in FIG. 9 may also be used in a data processing system. The system further can include one or more Input/Output (I/O) ports 1025 to enable communication with another data processing system or device. The I/O port may connect the data processing system to a USB port, Bluetooth interface, card reader, document scanner, printer etc.

The data processing system also can include one or more input devices 1010 which are provided to allow a user to provide input to the system. These input devices may be a keypad or a keyboard or a touch screen overlaid and integrated with a display device such as display device 1030. It will be appreciated that one or more buses, not shown, may be used to interconnect the various components as is well known in the art.

An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

The memory 1005 may be a machine-accessible non-transitory medium on which is stored one or more sets of instructions (e.g., software 1006) embodying any one or more of the methodologies or functions described herein. The software 1006 may also reside, completely or at least partially, within the memory 1005 and/or within the processing system 1020 during execution thereof by the system 1000, the memory and the processing system also constituting machine-accessible storage media. The software 1006 may further be transmitted or received over a network via the network interface device 1015.

In one embodiment, a machine-accessible non-transitory medium (e.g., memory 1005) contains executable computer program instructions which when executed by a data processing system cause the system to perform a method (e.g., method 100, method 150, method 700). For example, the operations of the method 100 include generating a first set of data associated with the first machine for generating a first map (e.g., planting map, harvesting map) and generating a second set of data associated with the second machine for generating a second map (e.g., planting map, harvesting map). The first and second sets of data can be generated at similar or different times. The operations further includes generating a first map for the first machine based on the first set of data and generating a second map for the second machine based on the second set of data. The first and second maps can be generated at similar or different times. Then, the operations further include sending with processing logic of the first machine the first map or first set of data for generating the first map to the cloud based system and sending with the processing logic of the second machine second map or second set of data for generating the second map to the cloud based system. The processing logic of each machine may communicate with a network interface of each machine for sending the maps or data to the cloud based system.

The operations further include receiving with processing logic of the first machine the second map or second set of data for generating the second map from the cloud based system and receiving with processing logic of the second machine the first map or first set of data for generating the first map from the cloud based system.

The operations further include generating at least one shared collaborative map for the first or second machine based on the first and second maps or based on the first and second sets of data. The operations further includes providing with processing logic the at least one shared collaborative map to at least one of a cab monitor of the first machine and a cab monitor of the second machine.

For another example, the operations of the method 150 include receiving with processing logic of a cloud based system a first set of data or a first map (e.g., planting map, harvesting map) from a first machine and also receiving a second set of data or a second map (e.g., planting map, harvesting map) from a second machine. The cloud based system receives communications that include at least one of data and maps from the first and second machines.

The operations optionally generate with processing logic of the cloud based system a first map for the first machine based on the first set of data and optionally generate a second map for the second machine based on the second set of data. Alternatively, the cloud based system does not need to generate the first and second maps if these maps are received from the first and second machines.

The operations further include generating with processing logic of the cloud based system generates at least one shared collaborative map or data for generating at least one shared collaborative map for the first or second machine based on the first and second maps or based on the first and second sets of data. For example, processing logic of the cloud based system generates a first shared collaborative map for the first machine and a second shared collaborative map for the second machine.

The operations further include sending with processing logic of the cloud based system at least one shared collaborative map or data for generating the at least one shared collaborative map to at least one of the first machine and the second machine.

For another example, the operations of the method 700 include generating with processing logic at least one shared collaborative map for at least one of a first machine and a second machine based on a first map for the first machine and a second map for the second machine or based on data for generating for the first and second maps. For example, processing logic of at least one of the first machine, the second machine, and the cloud based system generates the at least one shared collaborative map.

The operations further includes triggering with processing logic machine control of at least one of the first machine and the second machine based on the at least one shared collaborative map. For example, for a planter, processing logic of the first machine triggers machine control (e.g., swath control) of the first machine that uses clutches or shut off control of seed meters to avoid having the first machine replant regions that have already been planted by the first or second machine.

While the machine-accessible non-transitory medium (e.g., memory 1005) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method of generating a collaborative shared map between agricultural machines, comprising:
   generating, by a cloud-based system that is separate from a first agricultural machine and a second agricultural machine and that is configured to interface with the first and second agricultural machines, at least one shared collaborative map for at least one of the first and second agricultural machines;
   wherein said shared collaborative map indicates locations in a field where said first agricultural machine has already planted a first seed type, wherein said shared collaborative map indicates locations in the field where said second agricultural machine has already planted a second seed type;
   based on the shared collaborative map, the cloud-based system generating different triggers, wherein a first trigger of the different triggers is compatible with a first communications interface of the first agricultural machine and wherein a second trigger of the different triggers is compatible with a second communications interface of the second agricultural machine; and
   communicating, by the cloud-based system, the first trigger to the first agricultural machine and the second trigger to the second agricultural machine to cause the first and second agricultural machines to shut off seed meters to prevent having the first and second agricultural machines to replant regions that have been already planted by the first agricultural machine or the second agricultural machine.

2. The method of claim 1, further comprising: generating a first set of agricultural data with a processing logic of said first agricultural machine; and
   generating a second set of agricultural data with a processing logic of said second agricultural machine.

3. The method of claim 2, further comprising: sending a first map and said first set of agricultural data to a cloud-based system; and
   sending a second map and said second set of agricultural data to said cloud-based system.

4. The method of claim 3, further comprising: receiving, at said first agricultural machine, said second map and said second set of agricultural data to said cloud-based system; and receiving, at said second agricultural machine, said first map and said first set of agricultural data to said cloud-based system.

5. The method of claim 4, further comprising: providing said shared collaborative map to a cab monitor of said first agricultural machine.

6. The method of claim 5, wherein said first and second agricultural machines comprise seed planters including a plurality of seed sensors in data communication with said cab monitor, wherein said shared collaborative map indicates locations in the field wherein said first agricultural machine has already planted, and wherein said shared collaborative map indicates locations in the field wherein said second agricultural machine has already planted.

7. The method of claim 5, wherein said first and second agricultural machines comprise seed planters including a plurality of seed sensors in data communication with said cab monitor, wherein said shared collaborative map indicates locations in the field wherein said first agricultural machine has already planted the first seed type, and wherein said shared collaborative map indicates locations in the field wherein said second agricultural machine has already planted said second seed type.

8. The method of claim 5, wherein said first and second agricultural machines comprise harvesters including a yield sensor in data communication with said cab monitor, wherein said shared collaborative map includes locations in the field wherein said first agricultural machine has already harvested, and wherein said shared collaborative map indicates locations in the field wherein said first agricultural machine has already harvested.

9. The method of claim 5, further comprising: triggering machine control of said first agricultural machine based on said shared collaborative map.

10. The method of claim 7, further comprising: temporarily stopping a seed meter of said first agricultural machine from planting in order to prevent planting in an area indicated as already planted by said second agricultural machine according to said shared collaborative map.

11. One or more non-transitory, computer-readable storage media storing instructions for generating a collaborative shared map between agricultural machines, the instructions which, when executed by one or more processors, cause the one or more processors to perform:
generating, by a cloud-based system that is separate from a first agricultural machine and a second agricultural machine and that is configured to interface with the first and second agricultural machines, at least one shared collaborative map for at least one of the first and second agricultural machines;
wherein said shared collaborative map indicates locations in a field where said first agricultural machine has already planted a first seed type, wherein said shared collaborative map indicates locations in the field where said second agricultural machine has already planted a second seed type;
based on the shared collaborative map, the cloud-based system generating different triggers, wherein a first trigger of the different triggers is compatible with a first communications interface of the first agricultural machine and wherein a second trigger of the different triggers is compatible with a second communications interface of the second agricultural machine; and
communicating, by the cloud-based system, the first trigger to the first agricultural machine and the second trigger to the second agricultural machine to cause the first and second agricultural machines to shut off seed meters to prevent having the first and second agricultural machines to replant regions that have been already planted by the first agricultural machine or the second agricultural machine.

12. The one or more non-transitory, computer-readable storage media of claim 11, storing additional instructions for: generating a first set of agricultural data with a processing logic of said first agricultural machine; and
generating a second set of agricultural data with a processing logic of said second agricultural machine.

13. The one or more non-transitory, computer-readable storage media of claim 12, storing additional instructions for: sending a first map and said first set of agricultural data to a cloud-based system; and
sending a second map and said second set of agricultural data to said cloud-based system.

14. The one or more non-transitory, computer-readable storage media of claim 13, storing additional instructions for: receiving, at said first agricultural machine, said second map and said second set of agricultural data to said cloud-based system; and
receiving, at said second agricultural machine, said first map and said first set of agricultural data to said cloud-based system.

15. The one or more non-transitory, computer-readable storage media of claim 14, storing additional instructions for: providing said shared collaborative map to a cab monitor of said first agricultural machine.

16. The one or more non-transitory, computer-readable storage media of claim 15, wherein said first and second agricultural machines comprise seed planters including a plurality of seed sensors in data communication with said cab monitor, wherein said shared collaborative map indicates locations in the field wherein said first agricultural machine has already planted, and wherein said shared collaborative map indicates locations in the field wherein said second agricultural machine has already planted.

17. The one or more non-transitory, computer-readable storage media of claim 15, wherein said first and second agricultural machines comprise seed planters including a plurality of seed sensors in data communication with said cab monitor, wherein said shared collaborative map indicates locations in the field wherein said first agricultural machine has already planted the first seed type, and wherein said shared collaborative map indicates locations in the field wherein said second agricultural machine has already planted said second seed type.

18. The one or more non-transitory, computer-readable storage media of claim 15, wherein said first and second agricultural machines comprise harvesters including a yield sensor in data communication with said cab monitor, wherein said shared collaborative map includes locations in the field wherein said first agricultural machine has already harvested, and wherein said shared collaborative map indicates locations in the field wherein said first agricultural machine has already harvested.

19. The one or more non-transitory, computer-readable storage media of claim 15, storing additional instructions for: triggering machine control of said first agricultural machine based on said shared collaborative map.

20. The one or more non-transitory, computer-readable storage media of claim 17, storing additional instructions for: temporarily stopping a seed meter of said first agricultural machine from planting in order to prevent planting in an area indicated as already planted by said second agricultural machine according to said shared collaborative map.

* * * * *